US009767980B2

(12) United States Patent
Stifter, Jr. et al.

(10) Patent No.: US 9,767,980 B2
(45) Date of Patent: Sep. 19, 2017

(54) ELECTRICAL SWITCHING APPARATUS, AND SLOT MOTOR AND ENCLOSURE THEREFOR

(71) Applicant: EATON CORPORATION, Cleveland, OH (US)

(72) Inventors: Frank Joseph Stifter, Jr., Coraopolis, PA (US); Stephanie Fee Jin Lee, Ashland, MA (US); Brian Scott Jansto, Beaver Falls, PA (US); William George Eberts, Coraopolis, PA (US)

(73) Assignee: EATON CORPORATION, Cleveland, OH (US)

( * ) Notice: Subject to any disclaimer, the term of this patent is extended or adjusted under 35 U.S.C. 154(b) by 22 days.

(21) Appl. No.: 14/924,758

(22) Filed: Oct. 28, 2015

(65) Prior Publication Data
US 2017/0125196 A1    May 4, 2017

(51) Int. Cl.
H01H 9/30    (2006.01)
H01H 71/10   (2006.01)
H02N 11/00   (2006.01)
H01H 71/02   (2006.01)

(52) U.S. Cl.
CPC ............ *H01H 71/10* (2013.01); *H01H 71/02* (2013.01); *H02N 11/006* (2013.01)

(58) Field of Classification Search
CPC ........ H01H 71/02; H01H 71/10; H01H 33/38; H01H 77/108; H02N 11/006
USPC ........................................................ 335/201
See application file for complete search history.

(56) References Cited

U.S. PATENT DOCUMENTS

| 4,370,634 | A | * | 1/1983 | Kondo | ................... | H01H 73/18 335/16 |
| 4,743,720 | A | * | 5/1988 | Takeuchi | ............... | H01H 9/302 218/24 |
| 4,945,327 | A | * | 7/1990 | Doughty | ................ | H01H 9/342 335/147 |
| 4,963,849 | A | * | 10/1990 | Kowalczyk | ............ | H01H 9/342 218/35 |
| 6,060,674 | A | * | 5/2000 | Malingowski | ....... | H01H 77/108 200/272 |
| 6,281,459 | B1 | * | 8/2001 | Munsch | ............... | H01H 77/108 218/22 |
| 6,831,536 | B1 | * | 12/2004 | Zindler | ................ | H01H 77/108 335/201 |
| 6,970,059 | B2 | | 11/2005 | Mueller et al. | | |
| 7,348,514 | B2 | * | 3/2008 | Puskar | ................. | H01H 77/108 218/154 |
| 7,358,840 | B1 | | 4/2008 | Shea et al. | | |
| 7,532,097 | B2 | | 5/2009 | Malingowski et al. | | |
| 8,642,913 | B2 | * | 2/2014 | Maloney | ................ | H01H 9/341 218/149 |
| 8,884,728 | B2 | * | 11/2014 | Jang | ................... | H01H 71/0207 335/201 |
| 2002/0093404 | A1 | * | 7/2002 | Malingowski | ....... | H01H 71/164 335/35 |

(Continued)

*Primary Examiner* — Shawki S Ismail
*Assistant Examiner* — Lisa Homza
(74) *Attorney, Agent, or Firm* — Eckert Seamans; John Powers; Grant Coffield

(57) ABSTRACT

An enclosure is for a slot motor of an electrical switching apparatus. The slot motor includes a number of U-shaped laminations. The enclosure includes a first member and a second member coupled to the first member to form a U-shaped enclosed region for the U-shaped laminations.

16 Claims, 4 Drawing Sheets

(56) References Cited

U.S. PATENT DOCUMENTS

| | | | |
|---|---|---|---|
| 2007/0205852 A1* | 9/2007 | Helms | H01H 71/2463 335/172 |
| 2008/0079519 A1* | 4/2008 | Shea | H01H 77/108 335/201 |
| 2008/0191819 A1* | 8/2008 | Malingowski | H01H 77/108 335/16 |
| 2014/0110230 A1* | 4/2014 | Eberts | H01H 71/08 200/237 |
| 2014/0253264 A1* | 9/2014 | Eberts | H01H 9/30 335/16 |

* cited by examiner

ELECTRICAL SWITCHING APPARATUS, AND SLOT MOTOR AND ENCLOSURE THEREFOR

BACKGROUND

Field

The disclosed concept relates to electrical switching apparatus, such as, for example, circuit breakers. The disclosed concept further relates to slot motors for circuit breakers. The disclosed concept also relates to enclosures for slot motors.

Background Information

Electrical switching apparatus, such as circuit breakers, are employed in diverse capacities in power distribution systems. A circuit breaker may include, for example, a line conductor, a load conductor, a fixed contact and a movable contact, with the movable contact being movable into and out of electrically conductive engagement with the fixed contact. This switches the circuit breaker between an ON or closed position and an OFF or open position, or between the ON or closed position and a tripped or tripped OFF position. The fixed contact is electrically conductively engaged with one of the line and load conductors, and the movable contact is electrically conductively engaged with the other of the line and load conductors. The circuit breaker may also include an operating mechanism having a movable contact arm upon which the movable contact is disposed.

In order to enhance the speed of separation of the separable contacts, the contacts may be disposed within a slot motor, which increases interruption performance. Slot motors typically include a number of plates (e.g., laminations) composed of magnetically permeable material (e.g., steel), which surrounds the separable contacts and the movable contact arm of the circuit breaker. When the power circuit is live, an electrical arc may be drawn between the separable contacts during separation. The electrical current interacts electromagnetically with the slot motor to induce a magnetic field in the magnetic material of the slot motor, which, in turns, interacts with the separating contacts and the movable contact arm to accelerate the contact opening process.

Known slot motors include support members that protect respective steel laminations on one side of the steel laminations. During assembly, operators manually apply tape to opposing sides of the steel laminations. Applying tape is labor intensive and reduces productivity. Also, if applied incorrectly, the steel laminations can be exposed, resulting in dielectric breakdown after repeated interruptions. This in turn could cause an arc restrike, resulting in a failure of the circuit breaker to interrupt.

There is thus room for improvement in electrical switching apparatus, and in slot motors and enclosures therefor.

SUMMARY

These needs and others are met by embodiments of the disclosed concept, which are directed to an electrical switching apparatus, and slot motor and enclosure therefor.

As one aspect of the disclosed concept, an enclosure for a slot motor of an electrical switching apparatus is provided. The slot motor includes a number of U-shaped laminations. The enclosure comprises a first member and a second member coupled to the first member to form a U-shaped enclosed region for the U-shaped laminations.

As another aspect of the disclosed concept, a slot motor for an electrical switching apparatus is provided. The slot motor comprises a number of U-shaped laminations; and an enclosure comprising: a first member, and a second member coupled to the first member to form a U-shaped enclosed region enclosing the U-shaped laminations.

As another aspect of the disclosed concept, an electrical switching apparatus comprises: a number of U-shaped laminations; an enclosure comprising: a first member, and a second member coupled to the first member to form a U-shaped enclosed region enclosing the U-shaped laminations; and a line conductor coupled to the first member and the second member.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the term "U-shape" shall mean that the shape of a corresponding structure has the general shape of the letter "U" in which the bottom of such letter or structure is rounded, generally round, square, generally square, or partially round and partially square, or has the general shape of a base member with two leg (or arm) members extending normal or generally normal from the ends of the base member.

As used herein, the word "unitary" means that a component is created as a single piece or unit. That is, a component that includes pieces that are created separately and then coupled together as a unit is not a "unitary" component or body.

Figure 1:
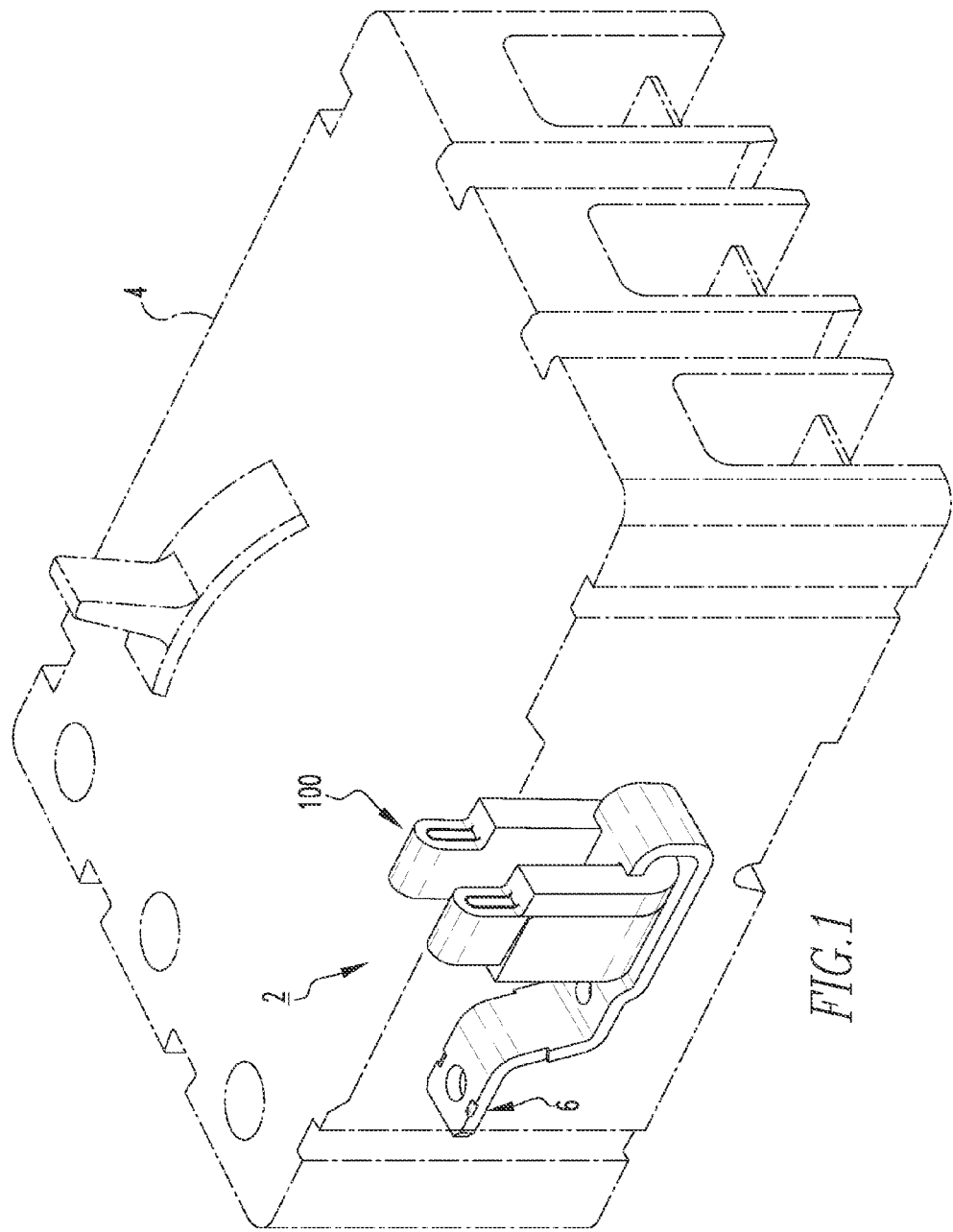
FIG. 1 is an isometric view of an electrical switching apparatus, and slot motor and enclosure therefor, in accordance with a non-limiting embodiment of the disclosed concept, with the electrical switching apparatus shown in simplified view.

FIG. 1 shows a simplified view of an electrical switching apparatus (e.g., without limitation, circuit breaker 2) in accordance with a non-limiting embodiment of the disclosed concept. The circuit breaker 2 includes a housing 4 (shown in simplified form in phantom line drawing), a line conductor 6 coupled to the housing 4, and a slot motor 100 coupled to the line conductor 6. For ease of illustration and economy of disclosure, only the one line conductor 6 and the one slot motor 100 will be shown and described herein, although it will be appreciated that the circuit breaker 2 has a plurality of other line conductors and a plurality of other slot motors substantially the same as the line conductor 6 and the slot motor 100, each corresponding to one of the poles of the circuit breaker 2.

Figure 2:
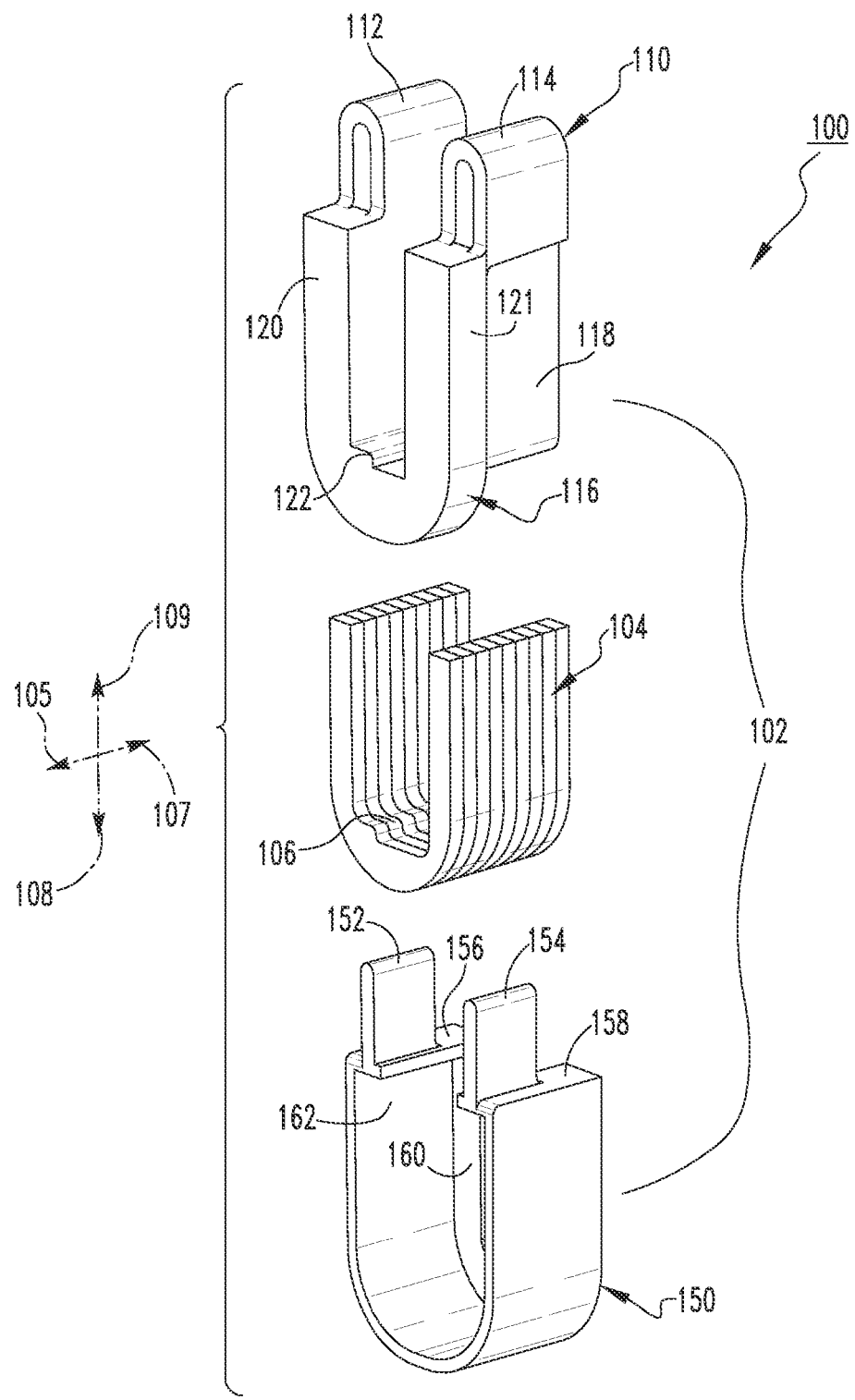
FIG. 2 is an exploded isometric view of the slot motor of FIG. 1.

FIG. 2 shows an exploded view of the slot motor 100. As shown, the slot motor 100 includes an enclosure 102 and a number of U-shaped laminations 104. As will be discussed in greater detail hereinbelow, the enclosure 102 is structured to reliably enclose the laminations 104, distinct from prior art slot motors (not shown) in which operators must manually apply tape to the laminations; a process that is labor-intensive and often results in problems, such as the laminations being undesirably exposed.

Continuing to refer to FIG. 2, the enclosure 102 includes a first member 110 and a second member 150. In one example, the first member 110 and the second member 150 are each made of cellulose filled melamine formaldehyde, a material which advantageously aids in clearing an electrical arc given off during interruption. Additionally, in the example shown, each of the first member 110 and the second member 150 is a single unitary component that is made by an injection molding process, thereby simplifying manufacturing.

The second member 150 is coupled to the first member 110 in order to form a U-shaped enclosed region for the U-shaped laminations 104. Stated differently, the first member 110 and the second member 150 cooperatively encapsulate the laminations 104, or fully surround the laminations 104, such that the laminations 104 always face the first member 110 and/or the second member 150. That is, all surfaces of each of the individual laminations 104 that do not face another of the individual laminations 104 face either the first member 110 and/or the second member 150. In this manner, the potential that the laminations 104 will be exposed during an interruption is substantially eliminated. Furthermore, the labor involved to assemble the slot motor 100 is advantageously simplified in that the only significant step involves coupling the first member 110 to the second member 150 with the laminations 104 located internal. As shown and described herein, this is relatively quick and easy to accomplish in accordance with the disclosed concept. As such, the need to manually apply tape is eliminated and productivity is increased.

The first member 110 includes a first female end portion 112 and a second female end portion 114 located opposite the first female end portion 112. The second member 150 includes a first male end portion 152 and a second male end portion 154 located opposite the first male end portion 152. The male end portions 152,154 are each coupled to a corresponding one of the female end portions 112,114 in order to prevent movement of the second member 150 with respect to the first member 110. In this manner, the first member 110 is interlocked with the second member 150. More specifically, the first member 110 is coupled to the second member 150 by a press-fit mechanism (i.e., by way of the end portions 112,114,152,154) without requiring the use of any intermediate components. Accordingly, during assembly, an operator simply inserts the laminations 104 into the second member 150, and slides the first member 110 onto the second member 150 in a manner such that the male end portions 152,154 get inserted into the respective female end portions 112,114. It will, however, be appreciated that any suitable alternative mechanism (not shown) may be employed in order to perform the desired coupling function, without departing from the scope of the disclosed concept.

The first member 110 also includes a first U-shaped retaining portion 116 and a second U-shaped retaining portion 118 extending from the first retaining portion 116. The second member 150 includes a first platform 156 and a second platform 158 that is spaced from, but generally located coplanar with the first platform 156. When the first member 110 is coupled to the second member 150, the first retaining portion 116 is located external the second member 150. Additionally, the second retaining portion 118 is generally located internal the second member 150. The first retaining portion 116 has a first U-shaped wall 120 and a second U-shaped wall 121 extending from the first wall 120. The second member 150 has a U-shaped wall 160 and another U-shaped wall 162 extending from the wall 160. The male end portions 152,154 each extend from and are located perpendicular with respect to a respective one of the platforms 156,158. Furthermore, the platforms 156,158 retain the laminations 104 within the first member 110 and the second member 150.

Figure 3:
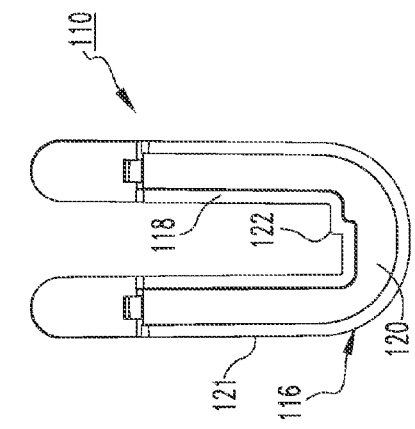
FIG. 3-5 are different views of a first member of the enclosure of FIG. 1.
Figure 4:
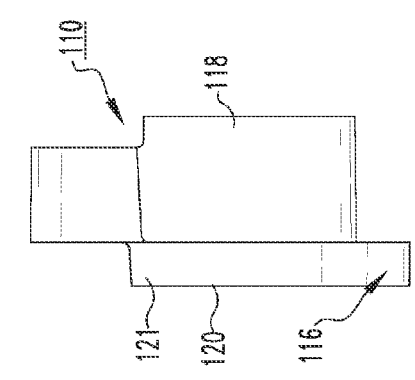
Figure 5:
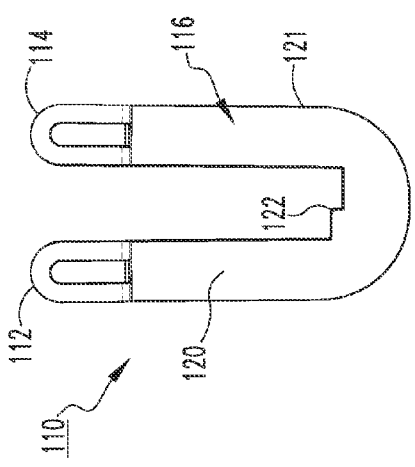
Figure 6:
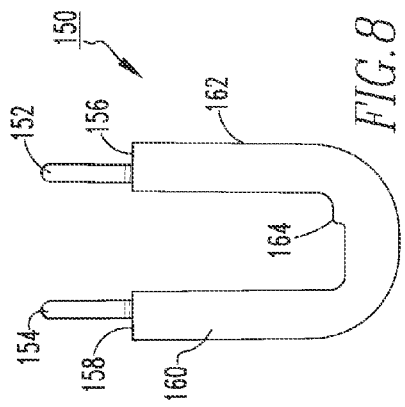
FIGS. 6-8 are different views of a second member of the enclosure of FIG. 1.
Figure 7:
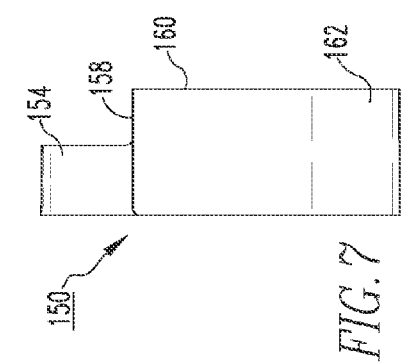
Figure 8:
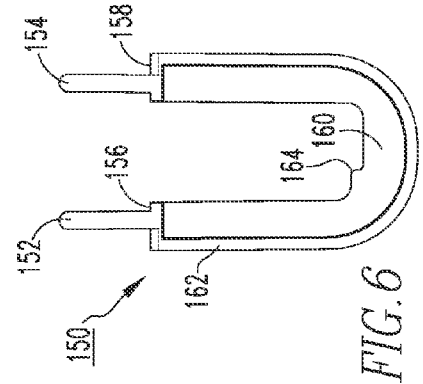

FIGS. 3-5 show the first member 110 from a variety of different views. It will be appreciated that the wall 120 is perpendicular to both the wall 121 and the second retaining portion 118. Additionally, as shown, the first member 110 includes a step feature 122. Similarly, FIGS. 6-8 show the second member 150 from a variety of different views. It will be appreciated that the first wall 160 is perpendicular to the second wall 162. Additionally, the second member 150 includes a step feature 164.

Referring again to FIG. 2, the wall 121 and the wall 162 continuously engage one another when the first member 110 and the second member 150 are coupled to one another. Stated differently, the wall 121 and the wall 162 sealingly engage one another such that an electrical arc will generally not pass through any opening between the first member 110 and the second member 150. The wall 120 is located opposite and parallel to the wall 160. The wall 120 and the wall 160 are structured to prevent movement of the laminations 104 in a first direction 105 and a second direction 107 opposite the first direction 105. The wall 162 extends from the wall 160 to the wall 121 (i.e., and proximate the wall 120). Additionally, the wall 162 and the second retaining portion 118 are structured to prevent movement of the laminations 104 in a third direction 108 and a fourth direction 109 opposite the third direction 108. The third direction 108 and the fourth direction 109 are perpendicular to the first direction 105 and the second direction 107. Accordingly, the disclosed construction advantageously ensures that the laminations 104 are enclosed by, reliably maintained by, and prevented from moving by the enclosure 102.

FIG. 2 also shows that each of the laminations 104 includes a step feature 106. It will be appreciated that the step features 106,122,164 of the laminations 104, the first member 110, and the second member 150, respectively, are each aligned with one another. That is, when the first member 110 is coupled to the second member 150, the distal edge portion of the step feature 122 continuously engages the distal edge portion of the step feature 164. Additionally, when the first member 110 and the second member 150 are coupled together to enclose the laminations 104, the step feature 106 follows (i.e., has substantially the same lateral and longitudinal contour as) the inner edge portions of the step features 122,164.

Figure 9:
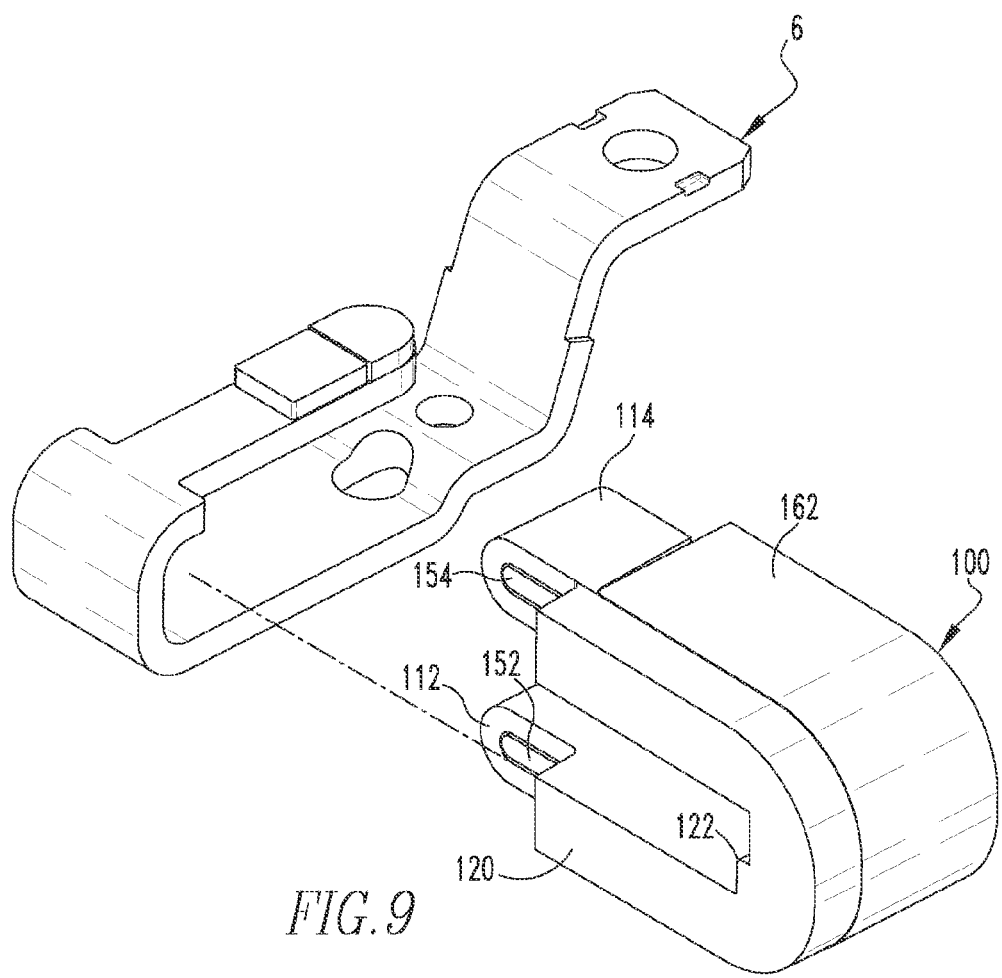
FIG. 9 is an exploded isometric view of the slot motor of FIG. 1, shown rotated 90 degrees relative to a line conductor so that assembly of the slot motor and the line conductor can be appreciated.

FIG. 9 shows an exploded view of the line conductor 6 and the slot motor 100, with the slot motor 100 rotated 90 degrees. By employing the step features 106,122,164, the slot motor 100 (i.e., the first member 110 and the second member 150) is able to receive and thereafter be coupled to the line conductor 6 without the need to pre-bend the line conductor 6, advantageously simplifying assembly. More specifically, during assembly, the slot motor 100 is able to wrap around the line conductor 6 because of the novel geometry (i.e., the step features 106,122,164). This is distinct from constructions of prior art slot motors (not shown) in which the line conductor is required to be undesirably bent in order to be coupled to the slot motor.

Accordingly, it will be appreciated that the disclosed concept provides for an improved (e.g., without limitation, more reliable and easier to assemble) electrical switching apparatus 2, and slot motor 100 and enclosure 102 therefor, in which a first member 110 and a second member 150 form a U-shaped enclosed region for a number of U-shaped laminations 104.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An enclosure for a slot motor of an electrical switching apparatus, said slot motor comprising a number of U-shaped laminations, said enclosure comprising:
   a first member; and
   a second member coupled to said first member to form a U-shaped enclosed region for said U-shaped laminations,
   wherein said second member comprises at least one end portion and at least one platform for retaining said U-shaped laminations within said first member and said second member; wherein said at least one end portion extends from and is disposed perpendicular with respect to said at least one platform; wherein said at least one end portion comprises a first end portion and a second end portion disposed opposite said first end portion; and wherein said at least one platform comprises a first platform and a second platform coplanar with said first platform.

2. The enclosure of claim 1 wherein said first member is interlocked with said second member.

3. The enclosure of claim 2 wherein said first member comprises at least one female end portion; and wherein said second member comprises at least one male end portion coupled to said at least one female end portion in order to prevent movement of said second member with respect to said first member.

4. The enclosure of claim 3 wherein said at least one female end portion comprises a first female end portion and a second female end portion disposed opposite said first female end portion; wherein said at least one male end portion comprises a first male end portion and a second male end portion disposed opposite said first male end portion; wherein said first female end portion is coupled to said first male end portion; and wherein said second female end portion is coupled to said second male end portion.

5. The enclosure of claim 1 wherein said first member comprises a first U-shaped retaining portion and a second U-shaped retaining portion extending from said first retaining portion; wherein said first retaining portion is disposed external said second member; and wherein said second retaining portion is generally disposed internal said second member.

6. The enclosure of claim 5 wherein said first retaining portion comprises a first U-shaped wall; wherein said second member comprises a second U-shaped wall disposed opposite and parallel to said first wall; and wherein said first wall and said second wall are structured to prevent movement of said laminations in a first direction.

7. The enclosure of claim 6 wherein said second member further comprises a third U-shaped wall disposed perpendicular to said second wall; wherein said third wall extends from said second wall to proximate said first wall; and wherein said third wall and said second retaining portion are structured to prevent movement of said laminations in a second direction perpendicular to the first direction.

8. The enclosure of claim 1 wherein said first member has a first step feature; and wherein said second member has a second step feature aligned with the first step feature.

9. The enclosure of claim 1 wherein said first member is coupled to said second member by a press-fit mechanism without any intermediate components.

10. The enclosure of claim 1 wherein said first member and said second member are made of cellulose filled melamine formaldehyde.

11. A slot motor for an electrical switching apparatus, said slot motor comprising:
    a number of U-shaped laminations; and
    an enclosure comprising:
        a first member, and
        a second member coupled to said first member to form a U-shaped enclosed region enclosing said U-shaped laminations; wherein said first member has a first step feature; wherein said second member has a second step feature aligned with the first step feature; and wherein each of said number of laminations has a third step feature aligned with the first step feature and the second step feature.

12. The slot motor of claim 11 wherein said second member comprises at least one end portion and at least one platform for retaining said U-shaped laminations within said first member and said second member; and wherein said at least one end portion extends from and is disposed perpendicular with respect to said at least one platform.

13. The slot motor of claim 11 wherein said first member comprises a first U-shaped retaining portion and a second U-shaped retaining portion extending from said first retaining portion; wherein said first retaining portion is disposed external said second member; and wherein said second retaining portion is generally disposed internal said second member.

14. The slot motor of claim 13 wherein said first retaining portion comprises a first U-shaped wall; wherein said second member comprises a second U-shaped wall disposed opposite and parallel to said first wall; and wherein said first wall and said second wall prevent movement of said laminations in a first direction.

15. The slot motor of claim 14 wherein said second member further comprises a third U-shaped wall disposed perpendicular to said second wall; wherein said third wall extends from said second wall to proximate said first wall; and wherein said third wall and said second retaining portion prevent movement of said laminations in a second direction perpendicular to the first direction.

16. An electrical switching apparatus comprising:
    a number of U-shaped laminations;
    an enclosure comprising:
        a first member, and
        a second member coupled to said first member to form a U-shaped enclosed re ion enclosing said U-shaped laminations; and a line conductor coupled to said first member and said second member; wherein said first member, said second member, and said number of laminations each have a step feature in order to receive the line conductor; and wherein said electrical switching apparatus is a circuit breaker.

\* \* \* \* \*